March 17, 1936.  D. GREGG  2,034,140
AIRPLANE HEATER
Filed Jan. 4, 1933
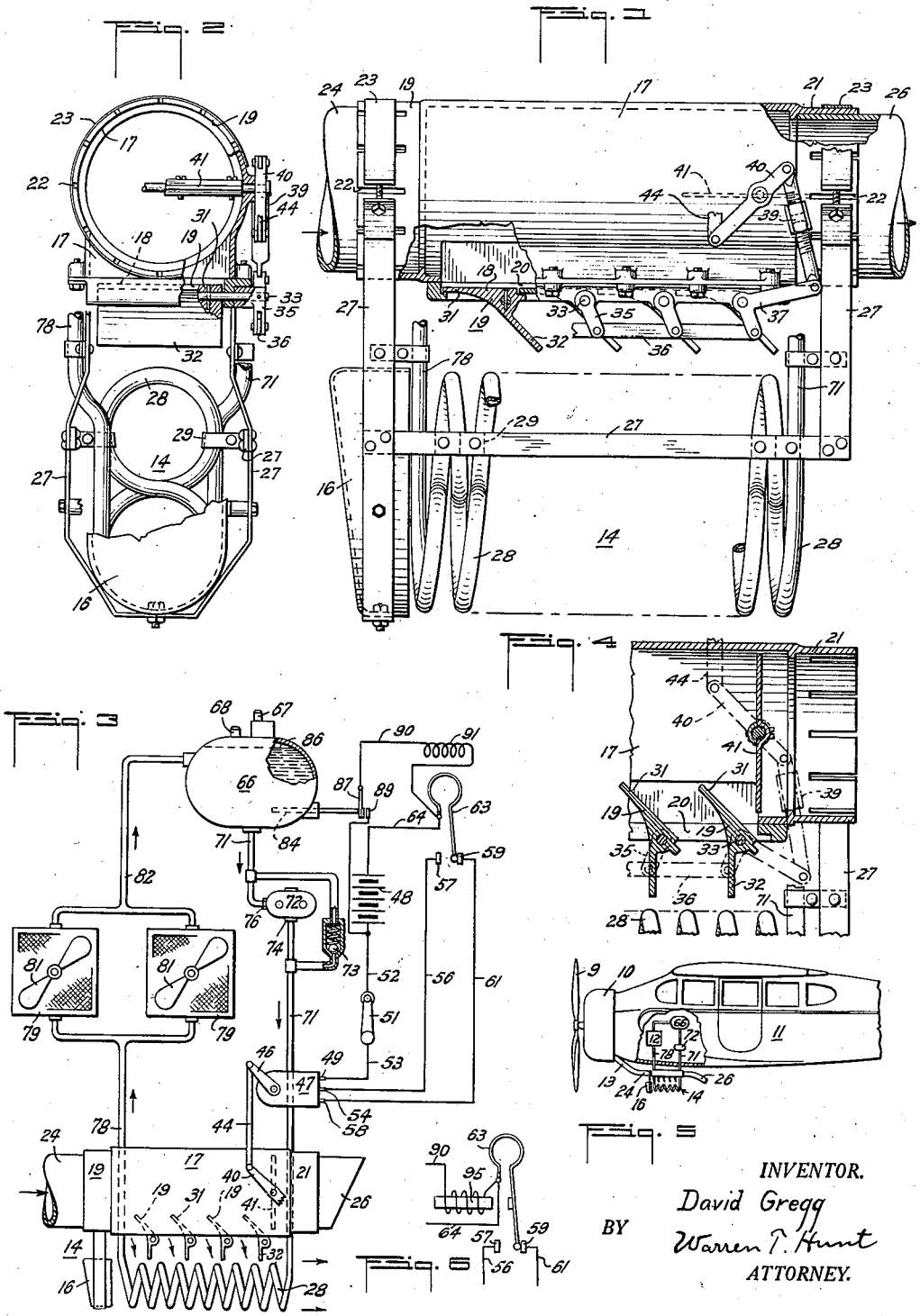
INVENTOR.
David Gregg
BY
Warren T. Hunt
ATTORNEY.

Patented Mar. 17, 1936

2,034,140

UNITED STATES PATENT OFFICE 2,034,140

AIRPLANE HEATER

David Gregg, Caldwell, N. J., assignor, by mesne assignments, to Eclipse Aviation Corporation, East Orange, N. J., a corporation of New Jersey Application January 4, 1933, Serial No. 650,177

1 Claim. (Cl. 237—12.3)

This invention relates to heating systems and more particularly to a liquid heating system for airplanes or other vehicles which are subjected to a wide range of temperature conditions.

Although liquid heaters for airplanes and automobiles are in common use, it has heretofore been the usual practice to use water as the cooling medium regardless of the danger of freezing during the time the vehicle is not in operation, and to rely on the operator to drain the system if the vehicle is to stand idle under low temperature conditions. The heat absorption member has usually been arranged in a manner to be subjected to the heat of the engine or the exhaust gases at all times which, under high temperature conditions, results in the over-heating of the heat absorption members and loss of fluid from evaporation. High boiling point fluids have also been used but because of the loss from evaporation incident to overheating, the use of such cooling mediums is expensive and water is ordinarily preferred.

In the present invention, it is the intention to use a high boiling point liquid such as glycol and to locate the heat receiving member, preferably a coil, outside of the exhaust pipe in a position wherein the gases may be directed toward the coil when heat is desired and directed away from the coil when heat is not desired. A thermostatic control is preferably used to vary the action of the exhaust gases, and provision has been made to keep the resistance of the exhaust pipe constant at all times and to prevent changes in speed of the engine during the control of the heater. Changes in engine speed are not of great importance when a single engine is used but when several engines are used, it is desirable to keep all of them synchronized as to speed, for otherwise objectionable noise and vibration result from the lack of synchronization.

An object of the invention is to provide a vehicle heating system that will be automatic in its operation.

Another object of the invention is to provide a liquid heating system for an airplane in which the cooling medium will not become overheated under high atmospheric temperature conditions.

Another object of the invention is to provide a liquid heating system for an airplane in which the liquid is heated by exhaust gas and controlled by the temperature of the liquid in a manner to direct the gas against the portion of the system during the operation of the heater and to direct the gas away from the system when the heater is inoperative.

Other features and objects of the invention will be apparent from the following description in connection with which a preferred embodiment of the invention has been disclosed in the accompanying drawing in which Fig. 1 is an enlarged view of a portion of the system, illustrating the connection of the heat receiving member to the engine exhaust pipe;

Fig. 2 is an end view of the heating member shown in Fig. 1;

Fig. 3 is a diagrammatic view of the circulating system and the thermostatic control means for regulating the exhaust gases;

Fig. 4 is a fragmental view of the heater showing the exhaust gas deflecting shutters in their open position;

Fig. 5 is a diagrammatic view illustrating the position of the exhaust pipe and heating coil with reference to the cabin of an airplane; and Fig. 6 is a diagrammatic view of a modified form of actuator for the cabin thermostat.

Referring to the drawing and particularly to Fig. 5, the numeral 9 represents the propeller of an airplane having an engine 10 and a cabin 11, the interior of which is intended to be heated by radiators indicated at 12. The engine exhaust pipe 13 is preferably located outside of the cabin 11 and the heat receiving element or coil 28 is secured thereto in any desired manner in a position to receive gases from the exhaust pipe, as shown in Fig. 1. Coil 28 is preferably positioned in the slip stream of the propeller 9 so as to receive cooling air therefrom and under certain conditions, it being understood that if it is desired to cool the coil 28, removable shield 16, normally in position to deflect air from the coil, will be removed. The heater which is generally designated at 14 in Fig. 5 is shown in detail in Figs. 1 and 2, and preferably is formed of a casting 17 having a flat floor 18 intermediate its end portions 19 and 21, each of which is slotted at 22 in order to be compressed by clamps 23 upon the engine exhaust pipe 24 and tail pipe 26. A frame work 27 depends from the casting 17 for supporting the heat receiving coil 28 which is secured to the frame by suitable clamps 29. A removable shield 16 is secured to frame 27 at the forward side of coil 28 in order to shield coil 28 from the slip stream of the propeller, but the shield is readily removable and may be discarded whenever the temperature conditions so warrant. The floor 18 of the heater is formed by a plurality of shutters 19 so arranged as to overlap and close the wall openings 20 when they are in the position shown in Fig. 1, and to have their floor portions 31 project upwardly into the body of the heater in a manner to direct gases outwardly against the coil 28 when the shutters are in the open position as illustrated in Fig. 4. Extensions 32 serve to direct the outflowing gases to a point adjacent the periphery of the coils 28 and preferably have a curvature decreasing in radius toward the exhaust pipe. Shutters 19 are preferably separately mounted on the heater by keyed pintles 33, to each of which is secured a lever 35 joined at their lower ends by a bar 36, the shutters being simultaneously opened or closed by bell crank lever 37 having an adjustable connection 39 with a lever 40 that is secured to throttle valve 41 pivotally mounted diametrally of the casting, the connection between valve 41 and shutters 19 being such as to close throttle 41 when shutters 19 are open.

As before stated, it is desirable to keep the resistance of the exhaust pipe constant in order to prevent variations in engine speed, and therefore it is preferred to use a linkage that will cause valve 41 to reduce the effective exit opening of exhaust pipe 24 proportionately to the opening of shutters 19, and to this end an adjusting nut or turn buckle 39 is incorporated between lever 40 and bell crank 37 which may be used to vary the relative positions of the throttle and the shutters. As best seen in Fig. 3, the actuation of the exhaust gas deflecting device is controlled by a rod 44 connected to an arm 46 of a control motor 47 of any desired construction, and the one illustrated is the well known control motor used for regulating domestic furnaces, it being realized that the type of the device is immaterial, and any other means may be employed if desired.

Operation of the control motor 47 is obtained by battery 48 connected to terminal 49 of the motor by switch 51 through leads 52 and 53. Terminal 54 is connected by lead 56 to contact point or terminal 57, and terminal 58 is connected to terminal 59 by lead 61. The circuit from either of terminals 57 and 59 is completed through a thermo-bar 63 to the opposite side of the battery by lead 64. The lower end of thermo-bar 63 which is located in the cabin in order to be responsive to the temperature therein, is freely movable between contacts 57 and 59 and in the cool position of the thermo-bar is in contact with terminal 59, in which position motor 47 pulls rod 44 upwardly in position to close the throttle 41 and open shutters 19, whereby gases are directed outwardly from the heater against the coil 28. In the hot position of the thermostat 63, the lower end thereof swings clockwise to contact terminal 57, in which position the control motor 47 is moved to open throttle 41 and close shutters 19.

The circulating system includes a supply tank 66 having a pressure relief valve 67 and a vacuum relief valve 68, each of the valves being adapted to open at a predetermined pressure and prevent excessive pressure or excessive vacuum to exist within the supply tank. The cooling medium employed is preferably one that has a high boiling point such as glycol or glycerine and is circulated through a conduit 71 by a circulating pump 72 which may be engine driven, and is preferably provided with a relief valve 73 adapted to open at a predetermined pressure to by-pass the excess fluid from the discharge opening 74 to the inlet opening 76. The fluid from the pump is forced downwardly through coil 28 and upwardly therefrom through conduit 78 to one or more radiators 79, each of which, if desired, may be provided with a rotary fan 81 for circulating air through the radiators. The fluid is conducted upwardly from radiators 79 through conduit 82 to the supply tank 66 from which it may be recirculated through the heating coil 28 in the manner described. In the control of the exhaust gases against the heating coil 28, it is preferred to employ a second thermostat 84 which is located beneath the level 86 of the cooling fluid within the supply tank 66. Expansion of thermostat 84 by heat of the liquid moves switch 87 toward the right to contact terminal 89 and completes an electrical circuit from the battery 48 and lead 90, through a heating coil 91 which is adjacent thermo-bar 63 and causes the same to move the lower arm of the thermo-bar to contact terminal 57 when the liquid becomes heated to a predetermined point, and cooling of the liquid and contraction of thermostat 84 breaks the circuit and permits the thermo-bar 63 to contact terminal 59 when the thermo-bar is cooled.

In the operation of the device, assuming that the engine is running, pump 72 may be thrown into operation by any desired means (not shown), whereupon fluid is circulated from supply tank 66 through the heat receiving coil 28 and through radiators 79 back to the supply tank. If the temperature conditions within the cabin are such as to require heating, the liquid within the supply tank will be cooled sufficiently to cause thermostat 84 to contract and break the electrical connection with heating coil 91, whereupon thermo-bar 63, if the cabin temperature is low enough, will cool sufficiently to enable the lower arm to contact terminal 59 and cause control motor 47 to shift the throttle 41 and shutters 19 to the position shown in Figs. 3 and 4. In this position of the heater the exhaust gases from pipe 24 will be prevented from passing through the tail pipe 26 and will be deflected outwardly through the wall of the heater against heating coil 28.

As soon as the temperature of the liquid reaches a predetermined point, thermostat 84 will expand and complete the electrical connection through coil 91, whereupon thermo-bar 63 will be heated and cause its lower arm to contact terminal 57, whereupon control motor 47 will force rod 44 downwardly to close shutters 19 and open throttle 41. It will be noted from the above description that the operation of the heater is automatic and will maintain a substantially constant temperature within the airplane cabin, and that when the heater is inoperative the heating coil 28 is not subjected to the hot gases. Therefore, there is practically no danger of loss of fluid from evaporation and if a fluid such as glycol or glycerine is used, the freezing point will be so low as to eliminate any need for draining the system when the airplane is idle and subjected to low temperature conditions.

If desired, thermo-bar 63 may be magnetically controlled, as shown in Fig. 6, wherein an electromagnet 95 has been substituted for the heating coil and acts to pull the thermo-bar into contact with terminal 57 when the circuit is completed through the magnet.

While a preferred embodiment of the invention has been illustrated and described, it is understood that this showing and description are illustrative only and that the invention is not regarded as limited to the form shown and described or otherwise, except for the terms of the following claim.

What is claimed is:

A heating system for an airplane having a cabin and an engine comprising an engine exhaust pipe, a liquid tank having a pressure relief valve, a radiator, a conduit connecting the tank and radiator including a coil adjacent the exhaust pipe, a circulating device for the liquid, a shutter in the wall of the exhaust pipe for directing gases through the wall toward the coil, exit controlling means for closing the exit opening of the exhaust pipe as the shutter is opened and for opening the exit when the shutter is closed, a servo-motor constructed and arranged in one position to close the shutter and open the exit means and in another position to open the shutter and close the exit means, means including a thermostat in the cabin for controlling the servo-motor to close the shutter when the temperature in the vicinity of the thermostat exceeds a predetermined temperature and to open the shutter below said predetermined temperature, an electrical heating circuit including a heater element in heat exchange relation to said thermostat, and a second thermostat in the liquid for energizing the electrical heating circuit when the temperature of the liquid exceeds a predetermined amount so as to cause the temperature in the vicinity of the first thermostat to exceed said predetermined temperature.

DAVID GREGG.